(12) United States Patent
Bertram et al.

(10) Patent No.: US 10,254,136 B1
(45) Date of Patent: Apr. 9, 2019

(54) PRISMATIC RELATIVE POSITIONING SYSTEM

(71) Applicant: Rockwell Collins, Inc., Cedar Rapids, IA (US)

(72) Inventors: Joshua R. Bertram, Ames, IA (US); Maxime M. Gariel, Sterling, VA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 173 days.

(21) Appl. No.: 15/131,506

(22) Filed: Apr. 18, 2016

(51) Int. Cl.
*G01D 5/30* (2006.01)
*G01T 1/29* (2006.01)
*B64D 47/06* (2006.01)
*G08G 5/02* (2006.01)
*B64C 39/02* (2006.01)
*G01S 5/16* (2006.01)

(52) U.S. Cl.
CPC ............ *G01D 5/30* (2013.01); *B64C 39/024* (2013.01); *B64D 47/06* (2013.01); *G01S 5/16* (2013.01); *G01T 1/2978* (2013.01); *G08G 5/025* (2013.01)

(58) Field of Classification Search
CPC ..................................................... G01D 5/30
See application file for complete search history.

(56) References Cited

U.S. PATENT DOCUMENTS

| | | | | |
|---|---|---|---|---|
| 2,993,997 A * | 7/1961 | McFarlane | ............ | B64D 39/00 250/225 |
| 3,581,090 A * | 5/1971 | Brown | ............ | G01S 5/166 250/363.01 |
| 3,664,746 A * | 5/1972 | McKnight | ............ | B64D 43/00 33/286 |
| 3,800,144 A * | 3/1974 | Dennis | ............ | G01S 1/02 250/362 |
| 3,940,609 A * | 2/1976 | Johnstun | ............ | G01D 5/30 250/231.13 |
| 4,778,988 A * | 10/1988 | Henderson | ............ | G01D 5/268 250/226 |
| 4,882,619 A * | 11/1989 | Hasegawa | ............ | H04N 5/2253 348/337 |
| 5,122,796 A * | 6/1992 | Beggs | ............ | G01S 7/4811 180/169 |
| 6,552,290 B1 * | 4/2003 | Lawandy | ............ | G07D 7/1205 209/576 |

(Continued)

*Primary Examiner* — David P Porta
*Assistant Examiner* — Jeremy S Valentiner
(74) *Attorney, Agent, or Firm* — Donna P. Suchy; Daniel M. Barbieri (57) ABSTRACT

A relative positioning system is described. At least one emitter is attached to a first object, where each of the at least one emitters includes: an electromagnetic radiation source configured to generate electromagnetic radiation over a band of wavelengths, and a prism arranged to refract and disperse the electromagnetic radiation from the electromagnetic radiation source according to the wavelength of the electromagnetic radiation. At least one electromagnetic radiation detector is attached to a second object arranged to detect the wavelengths of some of the electromagnetic radiation refracted and dispersed by a respective prism. At least one processor is configured to determine the relative position of the first object and the second object based on the detected wavelengths by the at least one electromagnetic radiation detector.

16 Claims, 6 Drawing Sheets

(56) References Cited

U.S. PATENT DOCUMENTS

| | | | |
|---|---|---|---|
| 2002/0126002 A1* | 9/2002 | Patchell | B60Q 9/008 340/436 |
| 2007/0223007 A1* | 9/2007 | Klaver | G01D 5/38 356/499 |
| 2012/0007979 A1* | 1/2012 | Schneider | G01J 3/36 348/116 |
| 2013/0076862 A1* | 3/2013 | Ohtomo | G01C 11/025 348/46 |

* cited by examiner

FIG. 18

PRISMATIC RELATIVE POSITIONING SYSTEM

The inventive concepts disclosed herein generally relate to the field of relative position systems.

BACKGROUND

Relative positioning can be important in systems, such as in relative navigation systems where the relative position of two objects may be desired to be known. For example, relative positioning can be important in relative navigation between unmanned aerial vehicles (UAVs). Generally, relative navigation requires precise relative positioning between the moving objects, such as between UAVs.

SUMMARY

In one embodiment of inventive concepts disclosed herein there is provided a relative positioning system. The relative positioning system comprises: at least one emitter attached to a first object, each of the at least one emitters comprising: an electromagnetic radiation source configured to generate electromagnetic radiation over a band of wavelengths; and a prism arranged to refract and disperse the electromagnetic radiation from the electromagnetic radiation source according to the wavelength of the electromagnetic radiation; at least one electromagnetic radiation detector attached to a second object arranged to detect the wavelengths of some of the electromagnetic radiation refracted and dispersed by a respective prism; and at least one processor configured to determine the relative position of the first object and the second object based on the detected wavelengths by the at least one electromagnetic radiation detector.

According to an aspect of the inventive concepts disclosed herein, the band of wavelengths includes a center wavelength.

According to an aspect of the inventive concepts disclosed herein, the at least one electromagnetic radiation detector comprises an array of electromagnetic radiation sensing cells, and the processor is further configured to determine an angle between a line perpendicular to a surface of the array and a line extending from the array to the at least one emitter based on a position of the radiation sensing cell which detects one of the detected wavelengths.

According to an aspect of the inventive concepts disclosed herein, the relative positioning system of claim 3, wherein the at least one electromagnetic radiation detector comprises a charge-coupled device (CCD) or a CMOS sensor.

According to an aspect of the inventive concepts disclosed herein, the at least one electromagnetic radiation detector comprises a two-dimensional array of electromagnetic radiation sensing cells, and the processor is further configured to determine a distance from the at least one electromagnetic radiation detector to the at least one emitter based on the number of electromagnetic radiation sensing cells detecting electromagnetic radiation of one of the wavelengths of the band of wavelengths.

According to an aspect of the inventive concepts disclosed herein, the at least one electromagnetic radiation detector comprises a charge-coupled device (CCD) or a CMOS sensor.

According to an aspect of the inventive concepts disclosed herein, the at least one emitter comprises a first emitter, and a second emitter oriented orthogonally to the first emitter, wherein the processor is configured to determine the relative position of the first object and the second object along a first dimension based on detected wavelengths of electromagnetic radiation from the first emitter, and to determine the relative position of the first object and the second object along a second dimension, orthogonal to the first dimension, based on detected wavelengths of electromagnetic radiation from the second emitter.

According to an aspect of the inventive concepts disclosed herein, the at least one electromagnetic radiation detector comprises: a first electromagnetic radiation detector corresponding to the first emitter and sensitive to detect electromagnetic radiation in a first band of wavelengths from a first electromagnetic radiation source of the first emitter, and a second electromagnetic radiation detector corresponding to the second emitter and sensitive to detect electromagnetic radiation in a second band of wavelengths from a second electromagnetic radiation source of the second emitter.

According to an aspect of the inventive concepts disclosed herein, the first band of wavelengths includes ultraviolet and the second band of wavelengths includes infrared.

According to an aspect of the inventive concepts disclosed herein, the at least one emitter comprises a first pair of emitters spaced from each other along a first dimension, and separated by a first spacing; and wherein processor is configured to determine the distance from the first object to the second object along a direction from the first object to the second object, and to determine the relative distance from the first object to the second object along the first dimension, based on the first spacing and the detected wavelengths by the at least one electromagnetic radiation detector.

According to an aspect of the inventive concepts disclosed herein, the at least one emitter comprises a second pair of emitters spaced from each other along a second dimension, and separated by a second spacing, the second dimension being orthogonal to the first dimension; and wherein the processor is configured to determine the relative distance from the first object to the second object along the second dimension based on the second spacing and the detected wavelengths by the at least one electromagnetic radiation detector.

According to an aspect of the inventive concepts disclosed herein, the at least one electromagnetic radiation detector comprises an array of separated electromagnetic radiation detectors having a spacing between adjacent detectors, wherein the processor is configured to determine the distance from the first object to the second object along the direction from the first object to the second object, and to determine an angle between an axis of the at least one emitter and a direction perpendicular to a line containing the array of separated electromagnetic radiation detectors, based on the detected wavelengths by the array of separated electromagnetic radiation detectors and based on the spacing between adjacent detectors.

According to an aspect of the inventive concepts disclosed herein, the at least one emitter comprises at least four emitters arranged along the first object, wherein the processor is configured to determine the three-dimensional orientation of the first object relative to the second object based on the detected wavelengths by the at least one electromagnetic radiation detector.

According to an aspect of the inventive concepts disclosed herein, the at least four emitters comprises at least two emitters arranged along a first dimension, and at least two emitters arranged in a second dimension orthogonal to the first dimension.

According to an aspect of the inventive concepts disclosed herein, the at least four emitters are arranged in circular formation.

According to an aspect of the inventive concepts disclosed herein, the at least four emitters are arranged in an asymmetric formation.

According to an aspect of the inventive concepts disclosed herein, the at least one emitter comprises a plurality of emitters, each of the plurality of emitters flashing electromagnetic radiation at a different frequency.

According to an aspect of the inventive concepts disclosed herein, the at least one emitter comprises a plurality of sets of emitters, the sets being arranged progressively from a center region of the plurality of sets of emitters of the first object, the processer configured to select the sets closer to the center point as the first object is determined to be closer to the second object and to select the sets further from the center point as the first object is determined to be further from the second object.

In another embodiment of inventive concepts disclosed herein there is provided a method of determining a relative position of a first object having at least one emitter attached thereto and a second object having at least one electromagnetic radiation detector attached thereto. The method comprises: generating, via the at least one emitter, electromagnetic radiation over a band of wavelengths; refracting and dispersing, via a prism, the generated electromagnetic radiation according to the wavelength of the electromagnetic radiation; detecting, via the at least one electromagnetic radiation detector, the wavelengths of some of the electromagnetic radiation refracted and dispersed by a respective prism, the at least one electromagnetic radiation detector comprising an array of separated electromagnetic radiation detectors having a spacing between adjacent detectors; and determining a distance from the first object to the second object along the direction from the first object to the second object, and determining an angle between an axis of the at least one emitter and a direction perpendicular to a plane containing the array of separated electromagnetic radiation detectors, based on the detected wavelengths by the array of separated electromagnetic radiation detectors and based on the spacing between adjacent detectors.

In another embodiment of inventive concepts disclosed herein there is provided a method of determining a relative position of a first object having at least one emitter attached thereto and a second object having at least one electromagnetic radiation detector attached thereto. The method comprises: generating, via the at least one emitter, electromagnetic radiation over a band of wavelengths; refracting and dispersing, via a prism, the generated electromagnetic radiation according to the wavelength of the electromagnetic radiation; detecting, via the at least one electromagnetic radiation detector, the wavelengths of some of the electromagnetic radiation refracted and dispersed by a respective prism; and determining the relative position of the first object and the second object based on the detected wavelengths.

DETAILED DESCRIPTION

Inventive concepts discloses herein regarding relative positioning employ a prism or prisms to break electromagnetic radiation, such as light, into its component pieces, allowing one object to detect its position relative to another object by examining the color of light, or more generally the wavelength of electromagnetic radiation, dispersed by the prism and detected.

Figure 1:
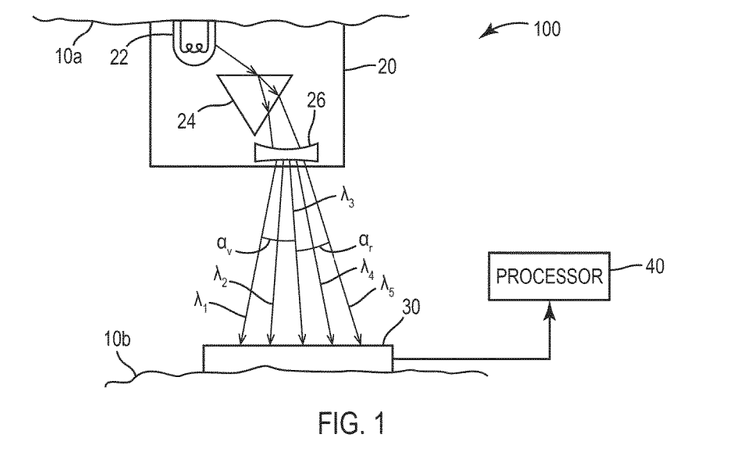
FIG. 1 is a schematic of a relative positioning system according to inventive concepts disclosed herein.

FIG. 1 illustrates a relative positioning system 100 according to an embodiment of the invention. The relative positioning system 100 includes at least one emitter 20 attached to a first object 10a, at least one electromagnetic detector 30 attached to a second object 10b, and a processor 40. The first object 10a and the second object 10b may both be moving, both be stationary, or one may be stationary while the other is moving.

The emitter 20 includes an electromagnetic radiation source 22 configured to generate electromagnetic radiation over a band of wavelengths. In this case the electromagnetic radiation source 22 may be a polychromatic electromagnetic radiation source emitting electromagnetic radiation over a broad spectrum. For example, if electromagnetic radiation source 22 emits light in the visible region, the electromagnetic radiation source 22 may be a white light source.

The emitter 20 further has a prism 24. The electromagnetic radiation source 22 is arranged relative to the prism 24 such that electromagnetic radiation from the electromagnetic radiation source 22 is directed to the prism 24, where the prism refracts and disperses the electromagnetic radiation according to the wavelength of the electromagnetic radiation. That is, the prism breaks the electromagnetic radiation from the electromagnetic radiation source 22 into it component wavelengths. As is well known for prisms, this refraction and dispersion of electromagnetic radiation is due to the wavelength dependent index of refraction of the prism material.

In practice, the prism 24 will refract and disperse light into many different wavelengths continuously as a function of wavelength. For ease of illustration, FIG. 1 illustrates five wavelengths, $\lambda_1$, $\lambda_2$, $\lambda_3$, $\lambda_4$ and $\lambda_5$, from shorter to longer, where $\lambda_3$ is the center wavelength of the band, $\lambda_1$ is the shortest wavelength, and $\lambda_5$ is the longest wavelength. The emitter 20 may further have optics such as a field of view lens 26 which further spreads out the electromagnetic radiation separated by the prism 24.

The electromagnetic detector 30 is arranged to detect the wavelengths of some of the electromagnetic radiation which is refracted and dispersed by the prism 24. The detector may be a charge-coupled device (CCD) or a CMOS sensor, or example. For example, FIG. 1 illustrates a detector 30 which is at central position from left to right such that it detects electromagnetic radiation with the center wavelength $\lambda_3$. If the detector 30 were arranged further to the left in FIG. 1, the detector would detect electromagnetic radiation having a shorter wavelength than the center wavelength $\lambda_3$. Correspondingly, if the detector 30 were arranged further to the right in FIG. 1, the detector would detect electromagnetic radiation having a longer wavelength than the center wavelength $\lambda_3$.

Referring to FIG. 1, the direction of the electromagnetic radiation with the shortest wavelength $\lambda_1$ makes an angle $\alpha_v$ with the direction of the electromagnetic radiation having the center wavelength $\lambda_3$. Further, the direction of the electromagnetic radiation with the longest wavelength $\lambda_5$ makes an angle $\alpha_r$ with the direction of the electromagnetic radiation with the center wavelength $\lambda_3$. So long as the detector 30 falls within the field of view between angles $\alpha_v$ and $\alpha_r$, the detector 30 will detect some electromagnetic radiation dispersed by the prism. In practice, the angle $\alpha_v$ (corresponding to wavelength $\lambda_1$) and angle $\alpha_r$ (corresponding to wavelength $\lambda_5$) would be calibrated and known. Further, the angles for all the wavelengths within the range $\alpha_v$ to $\alpha_r$, could be determined, such as by calibration to determine the intermediate angles corresponding to a certain wavelength, or by interpolation between the wavelengths $\lambda_1$ and $\lambda_3$, and between $\lambda_3$ and $\lambda_5$.

The relative positioning system 100 further includes at least one processor 40. The processor 40 is configured to perform certain functions. In this regard, the processor 40 is programmed and/or hardwired to perform the functions. In general, the processor is configured to determine the relative position of the first object and the second object based on the detected wavelengths by the electromagnetic radiation detector 30. For example, for the arrangement of FIG. 1, and given the calibration of the angles within the range $\alpha_v$ to $\alpha_r$, the processor 40 may determine the angle of the detector 30 with respect to the emitter 20.

Figure 2A:
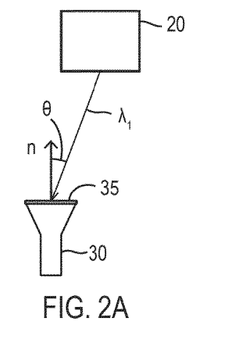
FIGS. 2A, 2B and 2C illustrate an arrangement of a detector relative to an emitter where the angular orientation of detector relative to the emitter is no rotation, counter clockwise, and clockwise, respectively, according to inventive concepts disclosed herein.

The angular orientation of the electromagnetic radiation detector 30 with respect to the emitter 20 may be determined in certain instances, for example, if the detector 30 comprises a two-dimensional array 35 of sensing cells 36. Alternatively, the detector 30 may comprise a one-dimensional array. FIG. 2A illustrates an arrangement where the detector 30 has a two-dimensional array 35 of sensing cells 36 (see FIG. 3A). Electromagnetic radiation having a wavelength $\lambda_1$ from the emitter 20 impinges on one of the sensing cells 36, as shown by the dark cell in FIG. 3A. The angle θ is between a line n perpendicular to a surface of the two-dimensional array 35 and a line extending from the two-dimensional array 35 to the at least one emitter 20. It should be noted that in FIG. 2A, the two-dimensional array 35 extends into the page, and the line n perpendicular to the surface of two-dimensional array 35 extends vertically. In the arrangement of FIG. 2A, the electromagnetic radiation having a wavelength $\lambda_1$ from the emitter 20 impinges on the cell 36 in the third row, second column of the array 35.

Figure 2B:
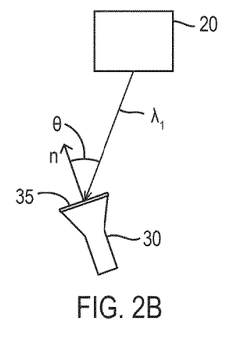
Figure 3A:
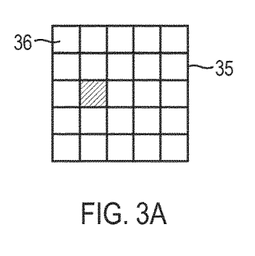
FIGS. 3A, 3B and 3C illustrate a two-dimensional array of sensing cells detecting electromagnetic radiation according to the arrangements in FIGS. 2A, 2B and 2C, respectively.
Figure 3B:
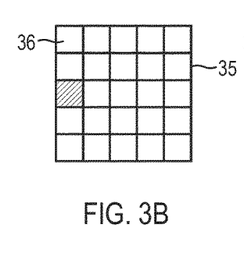

FIGS. 2B and 3B illustrate an arrangement where the detector 30 is rotated slightly counter clockwise relative to the arrangement in FIGS. 2A and 3A. In this case the angle θ is increased, and the electromagnetic radiation having a wavelength $\lambda_1$ from the emitter 20 impinges on the cell 36 in the third row, first column of the array 35, that is just to the left of the impinging cell for FIGS. 2A and 3A.

Figure 2C:
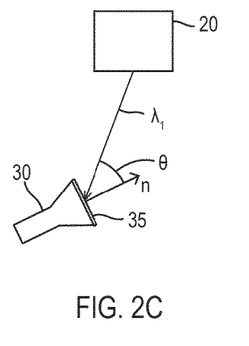
Figure 3C:
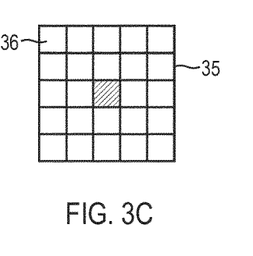

FIGS. 2C and 3C illustrate an arrangement where the detector 30 is rotated slightly clockwise relative to the arrangement in FIGS. 2A and 3A. In this case the angle θ is decreased, and the electromagnetic radiation having a wavelength $\lambda_1$ from the emitter 20 impinges on the cell 36 in the third row, third column of the array 35, that is just to the right of the impinging cell for FIGS. 2A and 3A.

Thus, according to the geometry in FIGS. 2A-2C, the processor 40 may be configured to determine an angle θ between a line perpendicular to a surface of the two-dimensional array 35 and a line extending from the two-dimensional array to the emitter 20 based on a position of the radiation sensing cell 36 which detects one of the detected wavelengths. Although FIGS. 2A-2C illustrate an arrangement using electromagnetic radiation at the wavelength $\lambda_1$ for illustration, other wavelengths may be used.

Figure 4A:
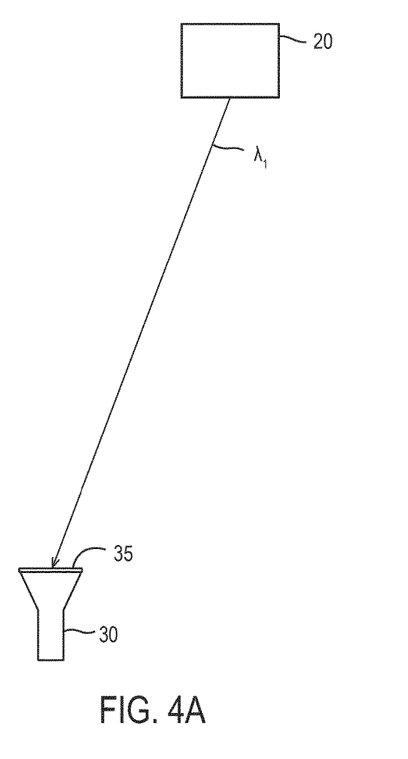
FIGS. 4A and 4B illustrate an arrangement of a detector relative to an emitter where the detector and emitter are relatively far, and relatively close, respectively.
Figure 4B:
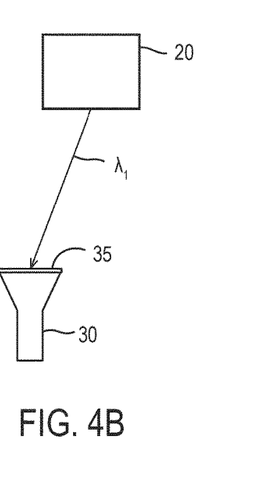
Figure 5A:
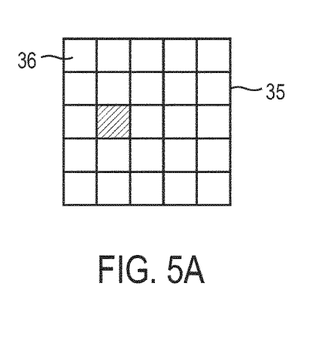
FIGS. 5A and 5B illustrate a two-dimensional array of sensing cells detecting electromagnetic radiation according to the arrangements in FIGS. 4A and 4B, respectively.
Figure 5B:
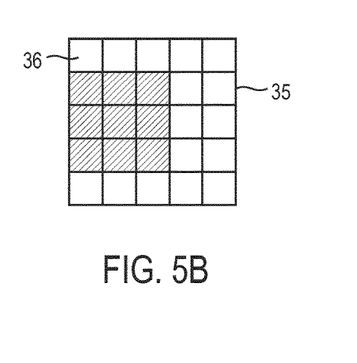

The distance from the electromagnetic radiation detector 30 to the emitter 20 may be determined in certain instances, for example, if the detector 30 comprises a two-dimensional array 35 of sensing cells 36. FIG. 4A illustrates the electromagnetic radiation detector 30 at a further distance from the emitter 20 than the arrangement shown in FIG. 4B. For the further arrangement shown in FIG. 4A, the image of electromagnetic radiation source 22 is smaller, resulting in a fewer number of cells 36 detecting radiation at the wavelength $\lambda_1$ as shown in FIG. 5A, which correspond to FIG. 4A. In contrast, for the closer arrangement shown in FIG. 4B, the image of electromagnetic radiation source 22 is larger, resulting in a larger number of cells 36 detecting radiation at the wavelength $\lambda_1$ as shown in FIG. 5B, which corresponds to FIG. 4B. Thus, based on the arrangements shown in FIGS. 4A and 4B, the processor 40 may determine a distance from the electromagnetic radiation detector 30 to the emitter 20 based on the number of electromagnetic radiation sensing cells 36 detecting electromagnetic radiation of one of the wavelengths of the band of wavelengths, and based on the size of electromagnetic radiation source 22. That is, a larger sized electromagnetic radiation source 22 will generate a larger sized image on the emitter 20 for the same distance between detector 30 and emitter 20. This size of the electromagnetic radiation source 22 could also be calibrated for. Although FIGS. 4A and 4B illustrate an arrangement using electromagnetic radiation at the wavelength $\lambda_1$ for illustration, other wavelengths may be used.

Orientation Along Two Axes

Figure 6:
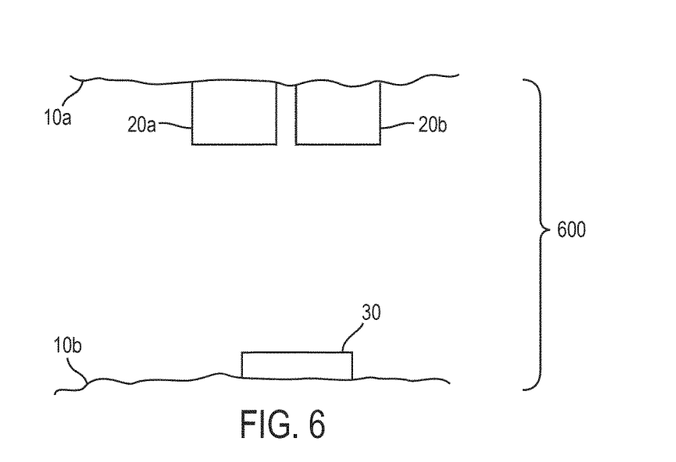
FIG. 6 is a schematic of a relative positioning system with two emitters oriented to allow for determination of relative position along two different directions according to inventive concepts disclosed herein.

FIG. 1 illustrates a system with one emitter 20 which provides detection of relative positioning along one axis. FIG. 6 illustrates a system 600 with two emitters 20, where each emitter 20 is similar to the emitter 20 illustrated in FIG. 1, except that one of the two emitters 20 has an arrangement to provide determination of relative positioning along one dimension, and the other of the two emitters 20 has an arrangement to provide determination of relative positioning along another dimension orthogonal to the first dimension.

Figure 7A:
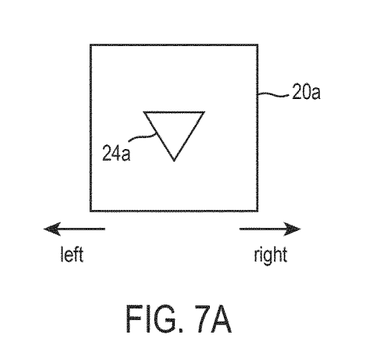
FIG. 7A illustrates one of the two emitters of the relative positioning system of FIG. 6 oriented to allow for determination of relative position along a first dimension according to inventive concepts disclosed herein.
Figure 7B:
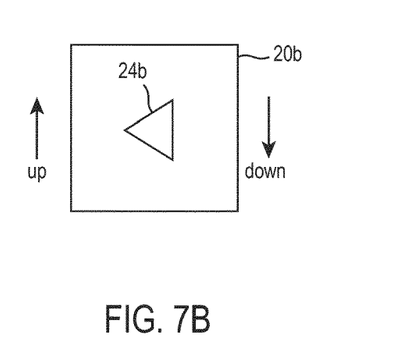
FIG. 7B illustrates the other of the two emitters of the relative positioning system of FIG. 6 oriented to allow for determination of relative position along a second dimension according to inventive concepts disclosed herein.

For example, as shown in FIG. 6, the first emitter 20a has an arrangement where the first prism 24a is oriented so as to allow for the determination of the relative positioning along a first dimension in the left and right directions (see FIG. 7A), and the second emitter 20b has an arrangement where the second prism 24b is oriented so as to allow for the determination of the relative positioning along a second dimension in the up and down directions (see FIG. 7B). The inventive concepts disclosed herein, however, are not limited to the first dimension being along left and right, and the second dimension being along up and down, but rather any directions are contemplated. Further the first and second dimensions need not be orthogonal, but may be simply different from each other.

According to the two axis arrangement shown in FIG. 6, the processor may determine the relative position of the first object 10a and the second object 10b along a first dimension based on detected wavelengths of electromagnetic radiation from the first emitter 20a, and determine the relative position of the first object 10a and the second object 10b along a second dimension, orthogonal to the first dimension, based on detected wavelengths of electromagnetic radiation from the second emitter 20b.

Further, when multiple emitters 20 are used, it would be possible for them to use independent parts of the electromagnetic spectrum, such as one emitter operating towards the infrared part of the spectrum and another using the ultraviolet part of the spectrum. In such a case, two types of detectors may be used, and may each have filters to only allow the part of the spectrum that is required.

Figure 8:
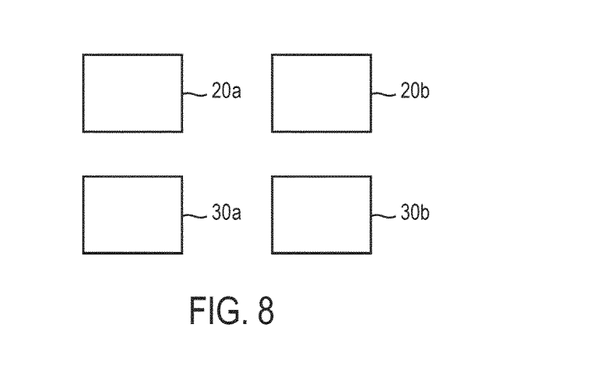
FIG. 8 illustrates an arrangement of two detectors and two emitters of a relative positioning system where one detector detects radiation in a first band and the other detector detects radiation in a second band, different from the first, according to inventive concepts disclosed herein.

In this case, the system may include an arrangement as shown in FIG. 8, with a first electromagnetic radiation detector 30a corresponding to the first emitter 20a and sensitive to detect electromagnetic radiation in a first band of wavelengths from a first electromagnetic radiation source of the first emitter 20a, and a second electromagnetic radiation detector 30b corresponding to the second emitter 20b and sensitive to detect electromagnetic radiation in a second band of wavelengths from a second electromagnetic radiation source of the second emitter 20b.

Figure 9:
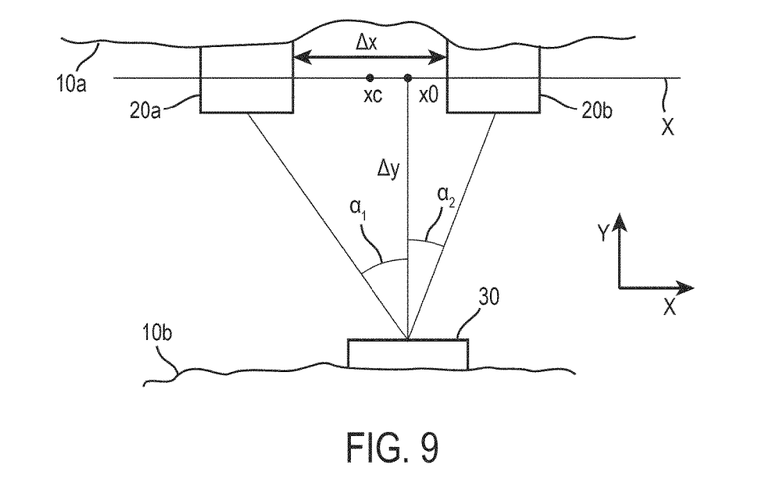
FIG. 9 illustrates an arrangement of two emitters have a fixed spacing, and a detector, allowing for the determination of the relative position to two objects along a first dimension, and the distance between the two objects according to inventive concepts disclosed herein.

FIG. 9 illustrates an embodiment with a pair of emitters, wherein in FIG. 9 the pair of emitters is first emitter 20a and second emitter 20b, arranged on the first object 10a with a spacing $\Delta x$ between the pair of emitters 20a and 20b, and the electromagnetic radiation detector 30 arranged on the second object 10b. The pair of emitters 20a and 20b are spaced from each other in the x-direction in FIG. 9, with the x value xc corresponding to the center point along the x-axis between the emitter 20a and the emitter 20b. Further, the line extending through both the emitter 20a and 20b is given as X and extends along the x-direction. This arrangement allows for the determination of relative position along a first dimension (the x-direction) of the first object 10a to the second object 10b. Further this arrangement allows for determination of the distance from the first object 10a to the second object 10b.

In a similar fashion to that described with respect to FIG. 1, the detector 30 receives dispersed electromagnetic radiation from the emitters 20a and 20b. Based on the wavelengths of the radiation detected from the first emitter 20a, the angle $\alpha_1$ may be determined, where the angle $\alpha_1$ is the angle between the line from the detector 30 to X, and the line from the detector 30 to the first emitter 20a. Similarly, based on the wavelengths of the radiation detected from the second emitter 20b, the angle $\alpha_2$ may be determined, where the angle $\alpha_2$ is the angle between the line from the detector 30 to X, and the line from the detector 30 to the second emitter 20b.

The distance from the center point xc to the point x0 where the line from the detector 30 intercepts and is perpendicular to X may then be determined from geometry since the spacing $\Delta x$ is known, and the angles angle $\alpha_1$ and $\alpha_2$ have been determined. The distance from the center point xc to the point x0 provides the relative position of the first object 10a to the second object 10b along the along the dimension upon which the pair of emitters 20a and 20b are spaced, i.e., along the x-direction in FIG. 9.

Further, the distance from the detector 30 to X may then be determined from geometry since the spacing $\Delta x$ is known, and the angles angle $\alpha_1$ and $\alpha_2$ have been determined. Further since the arrangement of the detector to the second object 10b is known, and the arrangement of the emitters 20a and 20b on the first object 10b is known, the distance from the first object to the second object may be determined.

Thus, based on the arrangement in FIG. 9, where a first pair of emitters 20a and 20b are spaced from each other along a first dimension, and separated by a first spacing, the processor 40 may determine the distance from the first object 10a to the second object 10b along a direction from the first object 10a to the second object 10b based on the first spacing and the detected wavelengths by the electromagnetic radiation detector 30. The processor 40 may also determine the relative distance from the first object 10a to the second object 10b along the first dimension, based on the first spacing and the detected wavelengths by the electromagnetic radiation detector 30.

Figure 10:
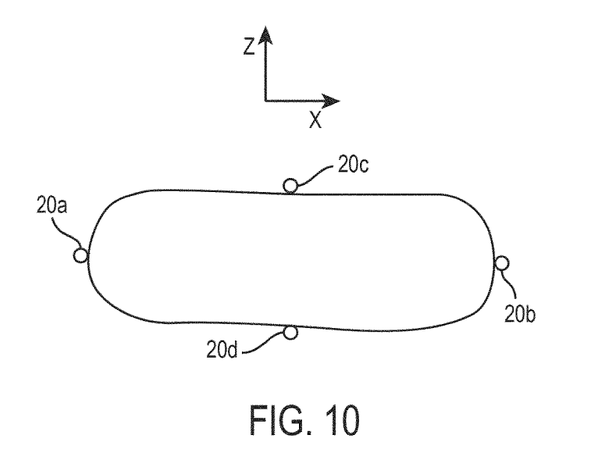
FIG. 10 illustrates an arrangement of two pairs of emitters allowing for the determination of the relative distance between two objects along a first dimension and along a second dimension, different from the first dimension, according to inventive concepts disclosed herein.

FIG. 10 illustrates an arrangement of emitters having two pairs of emitters instead of the single pair as shown in the FIG. 9 embodiment. Similar to FIG. 9, the FIG. 10 embodiment will also include an electromagnetic radiation detector 30 on the second object 10b. The embodiment of FIG. 10 specifically includes a first pair of emitters wherein in FIG. 10 the first pair of emitters are the first emitter 20a and second emitter 20b, and a second pair of emitters wherein in FIG. 10 the second pair of emitters are the emitters 20c and 20d. The first pair of emitters 20a and 20b are spaced by an amount Δx along the x-axis, as a first dimension, in a similar fashion to FIG. 9, while the second pair of emitters 20c and 20d are spaced by an amount Δz along the z-axis as a second dimension.

Based on the arrangement in FIG. 10, the processor 40 may determine the relative distance from the first object 10a to the second object 10b along the first dimension based on the first spacing and the detected wavelengths by the electromagnetic radiation detector 30. Further, the processor 40 may determine the relative distance from the first object 10a to the second object 10b along the second dimension based on the second spacing and the detected wavelengths by the electromagnetic radiation detector 30.

Figure 11:
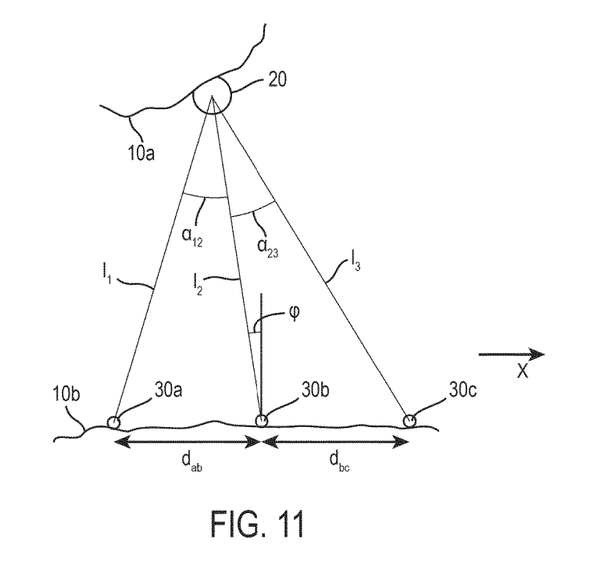
FIG. 11 illustrates an arrangement of an emitter and an array of detectors, which allowing for the determination of the relative distance and relative attitude between two objects according to inventive concepts disclosed herein.

FIG. 11 illustrates an arrangement which allows for the relative attitude between the first object 10a and the second object 10b, as well as the distance from the first object 10a to the second object 10b, and the lateral displacement (along x-axis in FIG. 11) of the first object 10a relative to the second object to be determined. The FIG. 11 arrangement includes an array of detectors 30a, 30b and 30c arranged linearly with a spacing d between adjacent detectors. While FIG. 11 illustrates three detectors, more than three detectors may be used. The array of detectors 30a, 30b, and 30c are presumed to be arranged along the x-axis as shown in FIG. 11. The lines 11, 12 and 13, respectively, are the lines from the detectors 30a, 30b, and 30c to the emitter 20. The line 12 makes an angle φ with respect to the y axis, which is perpendicular to the line passing through the detectors 30a, 30b, and 30c (the x-axis). The angle φ provides the attitude of the detector array relative to the emitter 20, and thus the attitude of the first object 10a relative to the second object 10b.

In a similar fashion to that described with respect to FIG. 1, each of the detectors 30a, 30b and 30c receives dispersed electromagnetic radiation from the emitter 20. Based on the wavelengths of the radiation detected from the emitter 20, the angle α12 may be determined, where the angle α12 is the angle between the lines l1 and l2, and the angle α23 may be determined, where the angle α23 is the angle between the lines l2 and l3.

Based on the known spacing d between adjacent detectors, and further based on the determined angles $\alpha_{12}$ and $\alpha_{23}$, the distance from the first object 10a to the second object 10b along the direction from the first object 10a to the second object 10b may be determined. It is not necessary that the spacing between the adjacent detectors be same for all adjacent detectors. For example, FIG. 11 illustrates a spacing between detector 30a and detector 30b to be $d_{ab}$ and a spacing between detector 30b and detector 30c to be $d_{bc}$. The spacings $d_{ab}$ and $d_{bc}$ may be the same or different. Further the receivers 30 may or may not be in the same plane. Further, the angle φ between a direction from the center detector 30b to the emitter 20 and a direction along the y-axis of the first object 10a having the emitter 20 may be determined. In some embodiments, the y-axis of the first object 10a may be perpendicular to the line containing the array of separated electromagnetic radiation detectors 30. Thus, the processor 40 may determine all of the distance between the first object 10a and second object 10b, the lateral displacement (along x-axis in FIG. 11) of the first object 10a relative to the second object, and the relative attitude based on the arrangement of FIG. 11.

Figure 12:
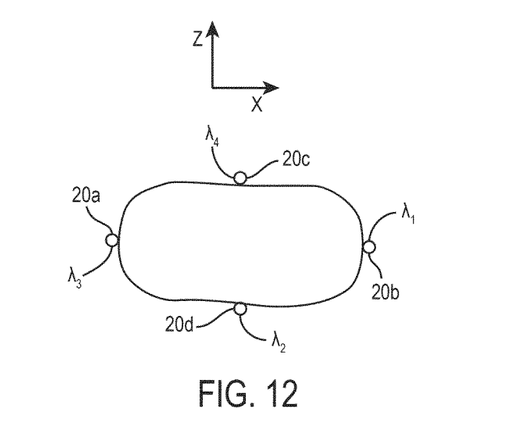
FIG. 12 illustrates an arrangement of four emitters which allows for the determination of the relative arrangement of a first object to a second object in three dimensions according to inventive concepts disclosed herein.

FIG. 12 illustrates an embodiment of an arrangement of emitters where at least one emitter 20 comprises four emitters 20a, 20b, 20c and 20d. In order to determine the relative arrangement of the first object 10a to the second object 10b in three dimensions, a minimum of four emitters, such as in the embodiment of FIG. 10, are needed. FIG. 12 illustrates the arrangement of the emitters 20a, 20b, 20c and 20d in the x-z plane.

Figure 13:
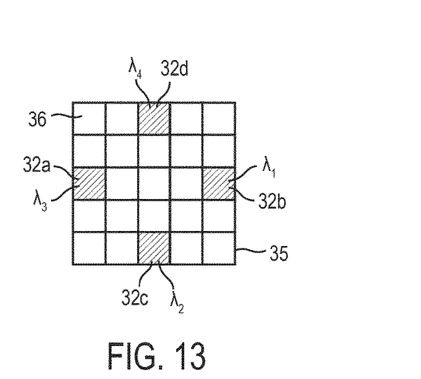
FIG. 13 illustrates a two-dimensional detector with sensing cells detecting the electromagnetic radiation from the four emitters of FIG. 12.

FIG. 13 illustrates the detector 30 of the arrangement of FIG. 12 with sensing cells 36 where the four of the cells have respectively detected the electromagnetic radiation from the emitters 20a, 20b, 20c and 20d. The four detecting cells 32a, 32b, 32c, and 32d respectively detect electromagnetic radiation from the emitters 20a, 20b, 20c and 20d. The wavelength of the electromagnetic radiation detected depends on the relative positioning of the emitters 20a, 20b, 20c and 20d relative to the detector, as discussed above with earlier embodiments. FIG. 13 illustrates the case where the wavelength of the electromagnetic radiation detected from the emitters 20a, 20b, 20c and 20d has a wavelength of $\lambda_3$, $\lambda_1$, $\lambda_5$, and $\lambda_2$, respectively.

While four emitters 20 may be used, it may instead be advantageous to use more emitters than are required in order to create a more readily-identifiable pattern in the image. For example, FIG. 14 illustrates an arrangement with two emitters 20 arranged along the vertical direction and more than two emitters 20 arranged along the horizontal direction on the first object 10a.

Figures 14, 15, 16, 17:
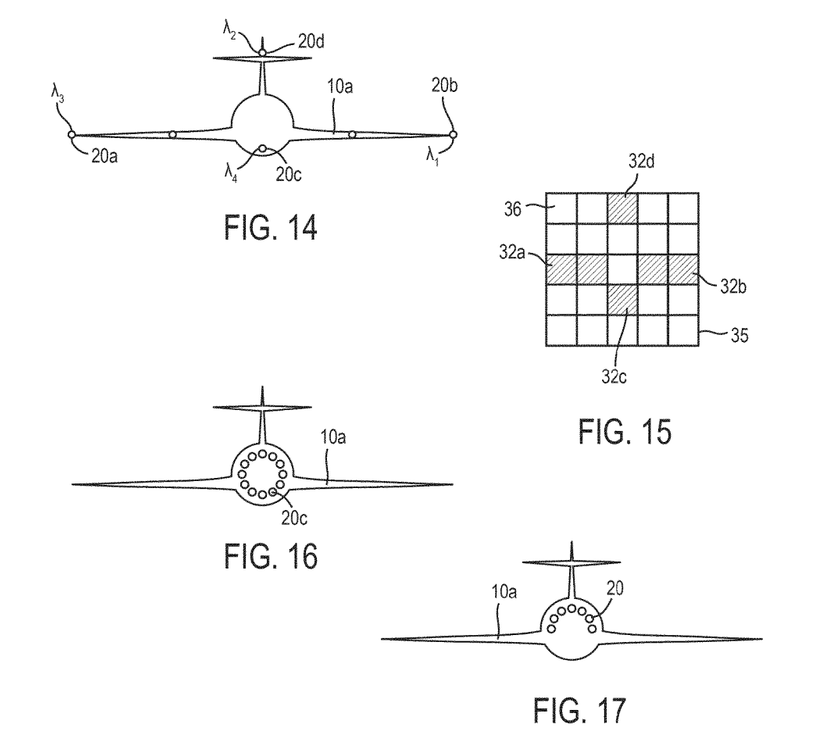
FIG. 14 illustrates an arrangement of emitters with two emitters along a first direction and more than two emitters along a second direction, which allows for the determination of the relative arrangement of a first object to a second object according to inventive concepts disclosed herein.
FIG. 15 illustrates a two-dimensional detector with sensing cells detecting the electromagnetic radiation from the four emitters of FIG. 14 according to inventive concepts disclosed herein.
FIGS. 16 and 17 illustrate an arrangement of emitters in a circular arrangement, and a semicircular arrangement about a center point according to inventive concepts disclosed herein.

FIG. 15 illustrates the detector 30 of the arrangement of FIG. 14 with sensing cells 36 where cells of the plurality of sensing cells have respectively detected the electromagnetic radiation from the plurality of emitters 20. The detecting cells 32 respectively detect electromagnetic radiation from respective of the emitters 20. The wavelength of the light detected depends on the relative positioning and orientation of the emitters 20 relative to the detector, as discussed with earlier embodiments.

The pattern of the detecting cells 32 provides an indication of the general arrangement of the emitters 20 on the first object 10a, and further provides a general indication of the relative position between the emitters 20 and the detector 30 as a function of the location of the emitters 30 on the first object 10a based on the detected wavelength.

Additionally, in the case the first object 10a is an aircraft, the emitters 20 may be arranged in a way that makes it easier to implement control of the aircraft. In this regard, FIG. 16 illustrates an arrangement where the emitters 20 are arranged in a circle on a portion of the first object 10a (which is an aircraft in this embodiment), while FIG. 17 illustrates an arrangement where the emitters 20 are arranged in a semicircle on a portion of the first object 10a (which is an aircraft in this embodiment).

The circular or semicircular arrangement of the emitters 20 may make it easier to guide an aircraft in an approach. A circular or semicircular arrangement has a simplification for control algorithms in that if the aircraft is aligned with the central axis of the circle or semicircle, then all wavelengths observed would be identical (because the angle along the center axis to any emitter is equal). The control algorithm would then know it is aligned when all wavelengths are identical. When there are wavelength differences between the emitters, the wavelengths will guide the controller back into alignment.

Note that using a semicircle would provide the same information as shown above, but would also have the advantage of revealing the orientation of the aircraft. A circular orientation as shown above has the disadvantage that the agent may not be able to determine "which way is up" without the asymmetry provided by the semicircle. In general, to implement the asymmetry, the arrangement of the emitters 20 should be asymmetrical so that the orientation of the leading aircraft (having the emitters 20) can be determined. Asymmetrical arrangements other than semicircular are contemplated.

According to certain disclosed inventive concepts, the emitters 20 may emit electromagnetic radiation in a manner which allows the emitter to be more easily identified in an environment where there are other sources of electromagnetic radiation emitting light in the same spectral band. For example, the emitters 20 can be made more identifiable by modulating their emission, such as by flashing at known rates. Each emitter 20 may have its own frequency, or its own distinguishable flashing pattern, that can be used to positively identify each emitter. For example, if the first object 10*a* is an aircraft, the flashing pattern of an emitter 20 may identify the emitter 20 as being attached to a certain portion of the aircraft, such as the left wing, right wing, etc. This identification allows the processor 40 to determine the orientation for the second object 10*b* relative to the aircraft having the emitter 20.

Figure 18:
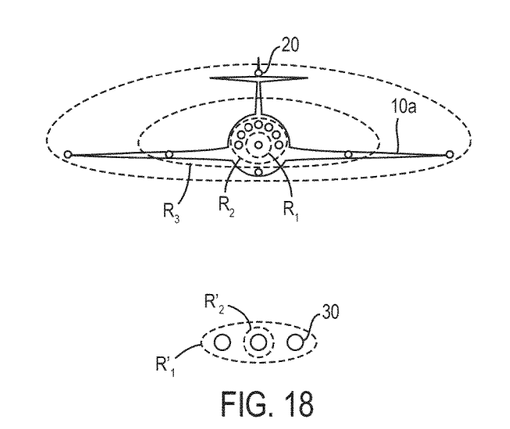
FIG. 18 illustrates an arrangement of emitters and detectors in different regions appropriate for different distance ranges between a first object and a second object.

In FIG. 18 the emitters 20 and detectors 30 may be arranged in a plurality of regions, where each region is appropriate for a different distance range from the first object 10*a* to the second object 10*b*. In FIG. 18, a first emitter region R1 includes an emitter 20 arranged appropriately for a short distance range between the first object 10*a* and the second object 10*b*. A second emitter region R2 includes emitters 20 arranged appropriately for a mid distance range between the first object 10*a* and the second object 10*b*. A third emitter region R3 includes emitters 20 arranged appropriately for a long distance range between the first object 10*a* and the second object 10*b*.

Further, a first detector region R1' includes a linear array of detectors 30 arranged appropriately for a short distance range between the first object 10*a* and the second object 10*b*. A second detector region R2' includes a single detector 30 arranged appropriately for a mid to long distance range between the first object 10*a* and the second object 10*b*.

When a detector 30 on the second object 10*b* is far away from the first object 10*a*, the emitter 20 in the third emitter region R3 and the detector 30 in the second detector region R2' may be selected. When a detector 30 on the second object 10*b* is a mid distance away from the first object 10*a*, the emitters 20 in the second emitter region R2 and the detector 30 in the second detector region R2' may be selected. On the other hand, when second object 10*b* with the detectors 30 is close to the first object 10*a* with the emitters 20, the emitter 20 in the first region R1 and the linear array of detectors 30 in the first detector region R1' may be selected. In this way, different goals can be accomplished by different groups of emitters and detectors using a blend of the techniques described above.

For example, in the case the first object 10*a* is an emitter aircraft with the emitters 20 and the second object 10*b* is a detector aircraft with detectors 30, the following procedure may be employed. Initially, when the detectors 30 are far from the aircraft, the emitter aircraft may use emitters 20 from emitter region R3, which may be as far as possible from each other in order to provide the greatest angle difference between the emitters 20. In this phase of the approach of the detector aircraft toward the emitter aircraft, the emitter aircraft will select the emitters 20 in emitter region R3 and the detector 30 in the region R2'. As the detector aircraft approaches closer, its field of view will reduce and some emitters 20 will not be visible anymore. At this point, the emitter aircraft will select the emitters 20 located in emitter region R2, such as, for example, in the tail door of the emitter aircraft, and the detector 30 in the region R2'. Finally, as the detector aircraft closely approaches the emitter aircraft, the emitter 20 in the first region R1 and the linear array of detectors 30 in the first detector region R1' may be selected, and very accurate positioning may be provided.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. A relative positioning system, comprising:
    at least one emitter attached to a first object, each of the at least one emitter comprising:
        an electromagnetic radiation source configured to generate electromagnetic radiation over a band of wavelengths; and
        a prism, having a triangular cross-section, arranged to refract and disperse the electromagnetic radiation from the electromagnetic radiation source according to the wavelength of the electromagnetic radiation;
    at least one electromagnetic radiation detector, comprising an array of electromagnetic radiation sensing cells, attached to a second object arranged to detect the wavelengths of some of the electromagnetic radiation refracted and dispersed by the prism of a respective emitter of the at least one emitter; and
    at least one processor configured to determine a relative position of the first object and the second object based on the detected wavelengths by the at least one electromagnetic radiation detector,
    wherein the at least one emitter comprises a first emitter, and a second emitter oriented orthogonally to the first emitter, wherein the processor is configured to determine the relative position of the first object and the second object along a first dimension based on detected wavelengths of electromagnetic radiation from the first emitter, and to determine the relative position of the first object and the second object along a second dimension, orthogonal to the first dimension, based on detected wavelengths of electromagnetic radiation from the second emitter.

2. The relative positioning system of claim 1, wherein the band of wavelengths includes a center wavelength.

3. The relative positioning system of claim 1, wherein the processor is further configured to determine an angle between a line perpendicular to a surface of the array and a line extending from the array to the at least one emitter based on a position of the radiation sensing cell which detects one of the detected wavelengths.

4. The relative positioning system of claim 3, wherein the at least one electromagnetic radiation detector comprises a charge-coupled device (CCD) or a CMOS sensor.

5. The relative positioning system of claim 1, wherein the at least one electromagnetic radiation detector comprises a two-dimensional array of electromagnetic radiation sensing cells, and the processor is further configured to determine a distance from the at least one electromagnetic radiation detector to the at least one emitter based on the number of electromagnetic radiation sensing cells detecting electromagnetic radiation of one of the wavelengths of the band of wavelengths.

6. The relative positioning system of claim 5, wherein the at least one electromagnetic radiation detector comprises a charge-coupled device (CCD) or a CMOS sensor.

7. The relative positioning system of claim 1, wherein the at least one electromagnetic radiation detector comprises:
a first electromagnetic radiation detector corresponding to the first emitter and sensitive to detect electromagnetic radiation in a first band of wavelengths from a first electromagnetic radiation source of the first emitter, and
a second electromagnetic radiation detector corresponding to the second emitter and sensitive to detect electromagnetic radiation in a second band of wavelengths from a second electromagnetic radiation source of the second emitter.

8. The relative positioning system of claim 7, wherein the first band of wavelengths includes ultraviolet and the second band of wavelengths includes infra-red.

9. A relative positioning system, comprising:
at least one emitter attached to a first object, each of the at least one emitter comprising:
an electromagnetic radiation source configured to generate electromagnetic radiation over a band of wavelengths; and
a prism, having a triangular cross-section, arranged to refract and disperse the electromagnetic radiation from the electromagnetic radiation source according to the wavelength of the electromagnetic radiation;
at least one electromagnetic radiation detector, comprising an array of electromagnetic radiation sensing cells, attached to a second object arranged to detect the wavelengths of some of the electromagnetic radiation refracted and dispersed by the prism of a respective emitter of the at least one emitter; and
at least one processor configured to determine a relative position of the first object and the second object based on the detected wavelengths by the at least one electromagnetic radiation detector,
wherein the at least one emitter comprises a first pair of emitters spaced from each other along a first dimension, and separated by a first spacing; and
wherein processor is configured to determine the distance from the first object to the second object along a direction from the first object to the second object, and to determine the relative distance from the first object to the second object along the first dimension, based on the first spacing and the detected wavelengths by the at least one electromagnetic radiation detector.

10. The relative positioning system of claim 9, wherein the at least one emitter comprises a second pair of emitters spaced from each other along a second dimension, and separated by a second spacing, the second dimension being orthogonal to the first dimension; and
wherein the processor is configured to determine the relative distance from the first object to the second object along the second dimension based on the second spacing and the detected wavelengths by the at least one electromagnetic radiation detector.

11. A relative positioning system, comprising:
at least one emitter attached to a first object, each of the at least one emitter comprising:
an electromagnetic radiation source configured to generate electromagnetic radiation over a band of wavelengths; and
a prism, having a triangular cross-section, arranged to refract and disperse the electromagnetic radiation from the electromagnetic radiation source according to the wavelength of the electromagnetic radiation;
at least one electromagnetic radiation detector, comprising an array of electromagnetic radiation sensing cells, attached to a second object arranged to detect the wavelengths of some of the electromagnetic radiation refracted and dispersed by the prism of a respective emitter of the at least one emitter; and
at least one processor configured to determine a relative position of the first object and the second object based on the detected wavelengths by the at least one electromagnetic radiation detector,
wherein the at least one emitter comprises at least four emitters arranged along the first object, wherein the processor is configured to determine the three-dimensional orientation of the first object relative to the second object based on the detected wavelengths by the at least one electromagnetic radiation detector.

12. The relative positioning system of claim 11, wherein the at least four emitters comprises at least two emitters arranged along a first dimension, and at least two emitters arranged in a second dimension orthogonal to the first dimension.

13. The relative positioning system of claim 11, wherein the at least four emitters are arranged in circular formation.

14. The relative positioning system of claim 11, wherein the at least four emitters are arranged in an asymmetric formation.

15. The relative positioning system of claim 11, wherein the at least one emitter comprises a plurality of emitters, each of the plurality of emitters flashing electromagnetic radiation at a different frequency.

16. The relative positioning system of claim 11, wherein the at least one emitter comprises a plurality of sets of emitters, the sets being arranged progressively from a center region of the plurality of sets of emitters of the first object, the processer configured to select the sets closer to the center point as the first object is determined to be closer to the second object and to select the sets further from the center point as the first object is determined to be further from the second object.

* * * * *